US012698409B2

(12) United States Patent
Lugli et al.

(10) Patent No.: US 12,698,409 B2
(45) Date of Patent: Aug. 4, 2026

(54) CROSSLINKABLE AQUEOUS POLYMER DISPERSIONS WITH AMINOACID CROSSLINKER FOR TEXTILE

(71) Applicant: Arkema France, Colombes (FR)

(72) Inventors: Mario Lugli, Boretto (IT); Leo Mario Saija, Boretto (IT); Filippo Finetti, Boretto (IT); Maria-Chiara Piccinini, Boretto (IT)

(73) Assignee: Arkema France, Puteaux (FR)

( * ) Notice: Subject to any disclaimer, the term of this patent is extended or adjusted under 35 U.S.C. 154(b) by 350 days.

(21) Appl. No.: 17/312,550

(22) PCT Filed: Dec. 12, 2019

(86) PCT No.: PCT/IB2019/001364
§ 371 (c)(1),
(2) Date: Jun. 10, 2021

(87) PCT Pub. No.: WO2020/128624
PCT Pub. Date: Jun. 25, 2020

(65) Prior Publication Data
US 2022/0056303 A1 Feb. 24, 2022

(30) Foreign Application Priority Data

Dec. 18, 2018 (EP) ..................................... 18213467

(51) Int. Cl.
*C09D 133/02* (2006.01)
*C03C 25/1095* (2018.01)
(Continued)

(52) U.S. Cl.
CPC ........ *C09D 133/02* (2013.01); *C03C 25/1095* (2013.01); *C03C 25/14* (2013.01);
(Continued)

(58) Field of Classification Search
CPC .... C09D 133/02; C09D 7/20; C03C 25/1095; C03C 25/14; C03C 25/285;
(Continued)

(56) References Cited

U.S. PATENT DOCUMENTS

| | | | |
|---|---|---|---|
| 4,049,214 A | 9/1977 | Yamaguchi et al. | |
| 5,932,689 A | 8/1999 | Arkens et al. | |

(Continued)

FOREIGN PATENT DOCUMENTS

EP 1884526 A1 2/2008

*Primary Examiner* — Camie S Thompson
(74) *Attorney, Agent, or Firm* — Debodhonyaa Sengupta

(57) ABSTRACT

The invention relates to an aqueous coating composition, comprising: a) an aqueous polymer dispersion with said polymer containing monomeric units of at least one dicarboxylic acid monomer, bearing two carboxylic acid functional groups and said polymer remaining insoluble in water after neutralization and remaining in the form of dispersed polymeric particles having a mean particle size varying from 10 to 1000 nm, b) a crosslinker selected from aminoacids bearing at least two amino functional groups capable of reacting with said carboxylic functional groups. It also relates to its use in the treatment of flexible fibrous substrates, a method for and the coated or treated fibrous substrate.

15 Claims, 1 Drawing Sheet

(51) Int. Cl.

| | |
|---|---|
| *C03C 25/14* | (2018.01) |
| *C03C 25/285* | (2018.01) |
| *C08F 120/06* | (2006.01) |
| *C08K 5/17* | (2006.01) |
| *C09D 7/20* | (2018.01) |
| *D06M 13/342* | (2006.01) |
| *D06M 15/263* | (2006.01) |
| *D21H 19/12* | (2006.01) |

(52) U.S. Cl.
CPC .......... *C03C 25/285* (2013.01); *C08F 120/06* (2013.01); *C08K 5/175* (2013.01); *C09D 7/20* (2018.01); *D06M 13/342* (2013.01); *D06M 15/263* (2013.01); *D21H 19/12* (2013.01); *C08F 2810/20* (2013.01)

(58) Field of Classification Search
CPC .... C08F 2810/20; D21H 9/12; D06M 15/263; D06M 13/342; C08K 5/175
USPC ................................. 442/59; 526/59; 528/59
See application file for complete search history.

(56)                     References Cited

U.S. PATENT DOCUMENTS

| | | | |
|---|---|---|---|
| 6,249,936 B1 | 6/2001 | Webster | |
| 2007/0077837 A1 | 4/2007 | Lundquist | |
| 2012/0258640 A1 | 10/2012 | Rice | |
| 2017/0275447 A1* | 9/2017 | Junk | ..................... C09J 133/12 |

* cited by examiner

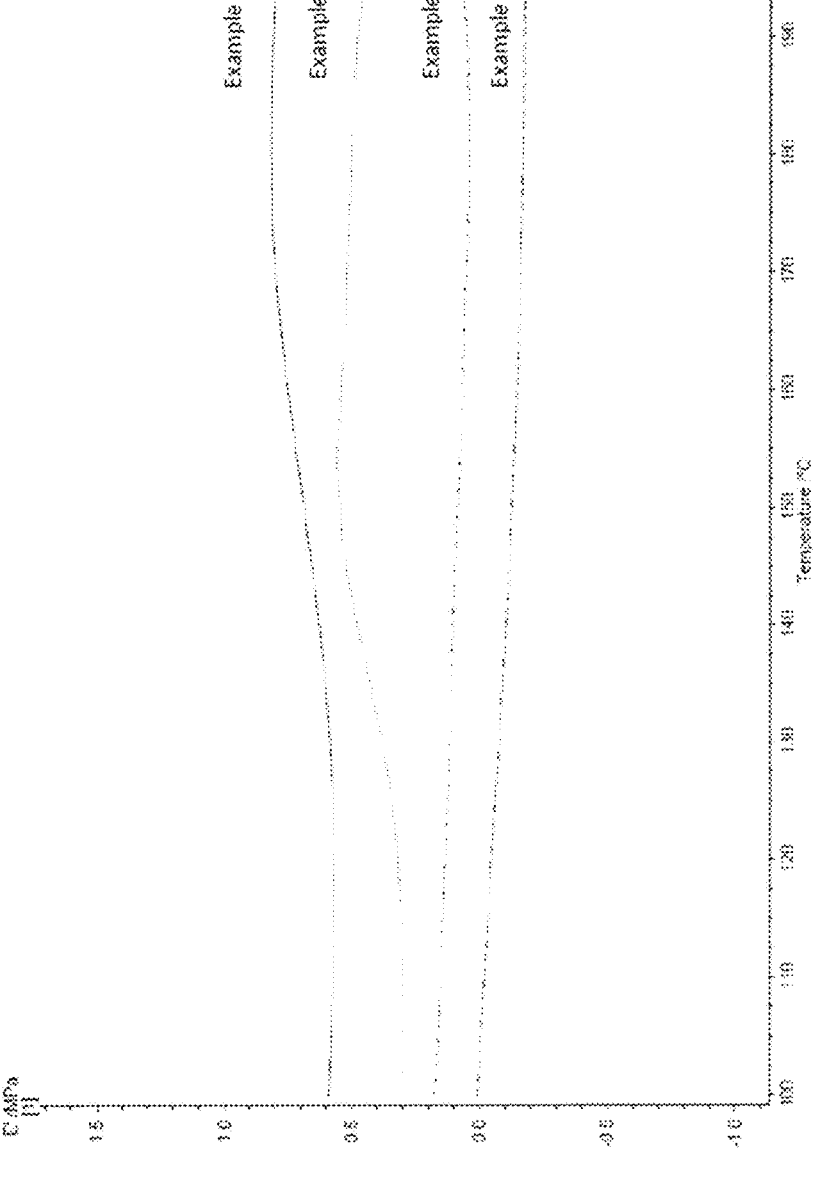

1

CROSSLINKABLE AQUEOUS POLYMER DISPERSIONS WITH AMINOACID CROSSLINKER FOR TEXTILE

CROSS-REFERENCE TO RELATED APPLICATIONS

This application is a national stage application under 35 U.S.C. § 371 of PCT/IB2019/001364, filed Dec. 12, 2019 which claims benefit to application EP 18.213467.6, filed Dec. 18, 2018.

FIELD OF THE INVENTION

The present invention relates to an aqueous coating composition comprising a crosslinkable aqueous polymer dispersion, suitable for the treatment of substrates such as textiles, paper, woven fabrics and non-woven fabrics and glass fibers. Said crosslinkable aqueous polymer dispersion is particularly suitable as binder in textile pigment printing application.

For these applications, it is suggested that the binder is applied on the substrate when said substrate is in a thermoplastic state in order have a better diffusion and interpenetration with it. Then, in order to ensure improved properties including wash durability, abrasion and dry-clean resistance, dry and wet strength, it is necessary that the binder becomes crosslinked.

The functional monomers that are most effective for this application (crosslinkable binder) are methylol derivatives of (meth)acrylamide, for example N-methylol (meth)acrylamide (N(M)MA). These monomers are characterized by an ethylenic double bond (ethylenic unsaturation) which allows them to undergo free-radical polymerization and the presence of —NHCH$_2$OH group (N-methylol group) enables crosslinking by means of a condensation reaction with other N-methylol groups at high temperature, in general above 100° C. In this way, covalent bonds are formed between polymeric chains or between a polymeric chain and the support (substrate). The main drawback of this crosslinking system is that, during the condensation reaction, which takes upon warming, there is a release of formaldehyde, which is toxic and carcinogenic.

Instead of these known systems, the present invention aims in providing an aqueous coating composition able to crosslink upon drying and heating at temperature above 100° C., without releasing formaldehyde with the advantage of using a crosslinking agent composed by (issued from) a biosourced food additive

BACKGROUND OF THE INVENTION

Some curable aqueous coating compositions for treating textile, non-woven, fabrics and glass fibers without using N-methylol(meth)acrylamide functionalized polymer are already known from prior art.

EP 2447306 discloses a co-polymer aqueous dispersion containing 0.1-5.0% of itaconic acid and 12.0-22.0% of monoethylenically-unsaturated monoacid monomer by weight to be used as a binder on woven fabrics, without any crosslinker added.

US 2007077837 discloses a curable aqueous composition formed by a polymer binder containing styrene or other monomers copolymerized with a groups able to form cyclic anhydrides, coupled with a component selected among polyol like triethanol amine or polyamine. The disclosed polymeric binder is water-soluble at pH>7 due to the presence of a high amount of carboxylic groups.

EP 1884526 discloses a curable composition for treating fibrous substrates, comprising one or more polyacids with at least two carboxylic acid groups, anhydride groups, one or more polyol comprising at least two hydroxyl groups and one or more reactive waterproofing agent chosen from a C$_5$ to C$_{30}$ alk(en)yl monocarboxylate or similar and optionally one or more phosphorous containing accelerator. The number of equivalents of said hydroxyl groups is from 1/0.01 to 1/3. In none of the claims and examples, lysine or other amino acids are cited.

U.S. Pat. No. 6,249,936 discloses a thermally curable aqueous composition, comprising at least one polymer, obtained by free-radical polymerization, which comprises ≤5% by weight of an ethylenically unsaturated mono- or dicarboxylic acid, in copolymerized form, at least one polymer, obtained by free-radical polymerization, which comprises ≥15% by weight of an ethylenically unsaturated mono- or dicarboxylic acid, in copolymerized form and at least one alkanolamine having at least two hydroxy alkyl groups.

U.S. Pat. No. 5,932,689 discloses a formaldehyde-free curable composition comprising a polyacid with at least two carboxylic acid groups, anhydride groups or salts of the polyacid thereof; an active hydrogen compound containing at least two active hydrogen groups selected from the group consisting of hydroxyl, primary amino, secondary amino and mixtures thereof and one or more compounds selected from the group consisting of cyanamide, dicyandiamide or similar and an accelerator.

None of these prior art documents discloses a crosslinkable aqueous coating composition, comprising as crosslinking agent an amino acid with at least 2 amino groups and an aqueous polymer dispersion, with the said polymer containing monomeric units from a polymerizable dicarboxylic acid in an amount of less than 20%, able to cure at a pH lower than 6.0, which does not release any formaldehyde during the curing process.

The object of the present invention is an aqueous polymer composition suitable for the production of a cross-linkable curable aqueous coating composition for treatment of fibrous substrates such as textiles, paper, woven fabrics and non-woven fabrics and glass fibers. It is particularly suitable to be used as binder in textile pigment printing application.

BRIEF DESCRIPTION OF THE DRAWING

FIG. 1 illustrates the dynamic modulus E' vs temperature for coalesced polymer films obtained from examples 1-4.

DETAILED DESCRIPTION OF THE INVENTION

For these applications, it is suggested that the binder is applied on the substrate when it (the substrate) is in a thermoplastic state in order to have a better diffusion and interpenetration with it. Then, it in order to ensure improved properties including wash durability, abrasion and dry clean resistance, dry and wet strength are necessary which are achieved when said binder is crosslinked.

The first subject-matter of the present invention relates to a crosslinkable aqueous coating composition comprising a) an aqueous polymer dispersion, with the polymer containing monomeric units from a dicarboxylic acid monomer and b) a crosslinker which is an amino acid bearing at least two amino functional groups.

The second subject of the invention relates to a use of said aqueous coating composition in the treatment of flexible fibrous substrates.

Another subject covered by the invention relates to a method of coating or treating a flexible fibrous substrate.

The invention does also cover a coating resulting from the cure of said aqueous coating composition and a related coated or treated substrate.

So, the first subject of the invention is an aqueous coating composition, which comprises:

a) an aqueous polymer dispersion with said polymer containing less than 20% in mol with respect to the total number of moles of monomeric units in said polymer of monomeric units of at least one di carboxylic acid monomer, bearing two carboxylic acid functional groups and said polymer dispersion remaining insoluble in water after neutralization and remaining in the form of dispersed polymeric particles having a mean particle size varying from 10 to 1000 nm, b) a crosslinker selected from aminoacids bearing at least two amino functional groups capable of reacting with said carboxylic functional groups, preferably said coating composition being free of any added catalyst (0%) for the reaction between said amino groups of said crosslinker and said carboxy groups of said polymer and also being able to cure at a pH range lower than 6.

The term "insoluble in water" means that the polymer is in the form of insoluble polymeric particles dispersed in the water and thus forming said aqueous polymer dispersion with a specific range of polymer particle size from 10 to 1000 nm.

The term "capable to cure at a pH range lower than 6" means that the crosslinkable aqueous coating composition can also cure in acidic conditions.

Said dicarboxylic acid monomer, bearing two carboxylic groups is an ethylenically unsaturated dicarboxylic acid/anhydride monomer.

More particularly, in said aqueous coating composition of the invention, said polymer in a) comprises the monomeric units from the following monomers:

a1) at least one ethylenically unsaturated monomer selected from the group consisting of acrylic and vinylic monomers, a2) at least one ethylenically unsaturated monomer different from a) and bearing at least two carboxylic acid functional groups at a weight content with respect to the total weight of said copolymer of from 0.1% to 15%, preferably from 0.2 to 10%.

Said monomer a2) is a dicarboxylic acid or anhydride monomer which is preferably selected from the group consisting of: maleic acid or anhydride, fumaric acid, itaconic acid or anhydride, tetrahydro phthalic acid or anhydride (cis 4-cyclohexene, 1,2-dicarboxylic acid or anhydride), citraconic acid and mesaconic acid. More preferably, said monomer a2) is itaconic acid or anhydride. Said dicarboxylic acid monomer, bearing two carboxylic acid functional groups is an ethylenically unsaturated dicarboxylic acid monomer.

More particularly, said monomer a1) comprises at least one monomer selected from the group consisting of $C_1$-$C_{18}$ alkyl (meth)acrylates, hydroxy alkyl $C_2$-$C_4$ (meth)acrylates, ureido-acetoacetate-diacetone-amido-functional (meth) acrylic or vinylic monomers, (meth)acrylic acid, vinyl acetate, vinyl fumarate, styrene, acrylonitrile, unsaturated silane, maleate, butadiene.

According to a particular option of said aqueous coating composition, the molar ratio of the amino groups of said crosslinker b) to the carboxy groups of said polymer of dispersion a) is of at least 0.1, preferably from 0.1 to 3.0, more preferably from 0.1 to 2.0.

By "amino group" is meant primary and/or secondary amino group, preferably primary —$NH_2$ group.

More particularly, said crosslinker b) is selected from: asparagine, arginine, glutamine, histidine, lysine, tryptophan, preferably arginine and lysine.

Preferably, in said aqueous coating composition of the invention, said aqueous polymer dispersion a) has a solids content from 25 to 60%, preferably from 30 to 55% by weight with respect to the weight of said dispersion a).

Another subject of the present invention relates to the use of said aqueous coating composition in the treatment of flexible fibrous substrates. Said flexible fibrous substrates are preferably selected from woven and non-woven fibers, fabrics, textile, paper, cardboard and glass fibers.

More particularly, said use is in textile pigment printing applications.

Another subject of the invention is a method of coating or treating a flexible fibrous substrate, which method comprises the following successive steps:

i) coating said flexible fibrous substrate with the aqueous coating composition as defined in any one of claims 1 to 7, either by impregnation or by spraying method or by using a coater ii) curing by coating composition heating the resulting substrate at a temperature in the range from 100 to 230 preferably from 130 to 180° C., preferably without any addition of any catalyst of the curing reaction iii) cooling the resulting coated or treated flexible substrate to ambient temperature.

The present invention also covers a coating, which results from the crosslinking (cure) of said coating composition by said crosslinker b).

Finally, the invention covers a finished product which is a coated or a treated flexible fibrous substrate, which results from the method of coating or treating as defined above according to the present invention. Said flexible fibrous substrate, either coated or treated, is preferably selected from woven and non-woven fibers, fabrics, textile, paper, cardboard and glass fibers.

Examples of suitable ethylenically unsaturated monomers according to a1) with monomeric units comprised in said polymer, added as a single type of monomer or as a mixture, include, but are not limited to:

vinylic monomers comprising aromatic monomers such as for example, styrene, α-methyl styrene, vinyl naphthalene, vinyl toluenes, chloromethyl styrene and the like and more particularly styrenic monomers other vinylic monomers like vinylic esters such as the allyl or diallyl ester of maleic acid, poly(allyl glycidyl ether), alkyl crotonates, vinyl acetate, di-n-butyl maleate, vinyl sulfonic acid monomers and the like acrylic monomers such as for example, methyl acrylate, methyl methacrylate, acrylic acid, methacrylic acid, ethyl acrylate, ethyl methacrylate, butylacrylate, butyl methacrylate, isobutyl acrylate, isobutyl methacrylate, ethylhexyl acrylate, ethylhexyl methacrylate, lauryl methacrylate, lauryl acrylate, octyl acrylate, octyl methacrylate, glycidyl methacrylate, allyl methacrylate, vinyl methacrylate, acetoacetoxyethyl methacrylate, acetoacetoxyethyl acrylate, acetoacetoxypropyl methacrylate, acetoacetopropryl acrylate, hydroxybutenyl methacrylate, di-octylmaleate, acrylonitrile, diacetoneacrylamide, acrylamide, methacrylamide, hydroxyethyl methacrylate, hydroxyethyl acrylate, acrylonitrile, and the like; and nitrogen containing monomers including t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethylacrylate, N-(2-methacryloyloxy-ethyl) ethylene urea, and methacrylamidoethylethylene urea, phosphorous containing monomers like phosphoethyl methacrylate, butyl acrylate, ethylacrylate, methyl methacrylate, hydroxyethyl methacrylate and (meth) acrylic acid are preferred as acrylic monomers.

Examples of suitable crosslinkers b) according to the present invention are amino acids containing at least 2 amino groups, added alone or as a mixture, and not limited to: asparagine, arginine, glutamine, histidine, lysine, tryptophan, preferably arginine, glutamine and lysine.

The amount of the crosslinker b) may vary from 0.1 to 50%, preferably from 0.1 to 26% by weight with respect to the dry polymer weight of the aqueous dispersion a).

The aqueous emulsion polymerization process of the present invention could employ initiators like persulfate salts, peroxide or hydroperoxide such benzoylperoxide, cumene hydroperoxide, di tert-butylperoxide, tertbutylhydroperoxide, hydrogen peroxide, azo-initiators such as for example asobisisobutyronitrile (AIBN), 2,2'-azodi (2-methyl butyronitrile) (AMBN) also redox initiator couples between the previous cited initiators and reducing agents could be used, among sodium salt of an organic sulfinic acid derivatives like acetic acid, hydroxysulfino-, disodium salt (Bruggolite® FF6), methabisulphite, hydrosulphite or other reducing agents could be used. Redox initiators like persulfate salts with methabisulphite, hydrosulphite or sodium salt of an organic sulfinic acid like Bruggolite® FF6 are preferred.

Preferably, the amount of initiators used in the present invention are 0.05-2%, more preferably 0.1-0.6% by weight of the total monomers.

A conventional surfactant or a combination of surfactants may be used as a stabilizer in the emulsion polymerization of the invention. Generally, the surfactant is at least one selected from the group consisting of an anionic surfactants and/or a non-ionic surfactants. Examples of preferred surfactants include, but are not limited to, alkali or ammonium salts of alkyl sulfate, alkyl aryl sulfate, alkyl ether sulfate, alkylsulfonic acid or fatty acid, alkyl diphenyloxide sulfonates and derivatives, fatty acid ethoxylated, $C_{10}$-$C_{18}$ alcohol ethoxylated sulfosuccinates and derivatives or any combination thereof. A list of suitable surfactants is available in the book "Surfactants and Polymers in Aqueous Solutions" (Holmberg et al. 2002 John Wiley & Sons). Polymerizable surfactants may be also used among styrenic derivatives of polyoxyethylene alkylphenyl ether ammonium sulfates for example, Hitenol® BC-10 or other polymerizable surfactants like Hitenol® HS 20 and Hitenol® HS 10, available from Asahy Denka.

During the emulsion polymerization, chain regulators such as mercaptans may be used for controlling the chain molecular weight of the resulting polymer. Examples of suitable mercaptans are n-dodecyl mercaptan (n-ddm) or tert-dodecyl mercaptan (tert-ddm). Also hypophosphite or phosphorous acid derivatives could be used to control molecular weight.

The temperatures of the emulsion polymerization process of the present invention are preferably between 4° and 100° C., but not limited by this range.

In certain embodiments, the phosphorous-containing species like phosphorous acid or sodium hypophosphite, could be used at a level of from 0% to 10%, preferably from 0% to 5%, further preferably from 0% to 2.5%, more preferably from 0% to 1%, by weight based on the dry weight of the polymer of the present invention, in order to accelerate the crosslinking process.

The curable aqueous composition of the present invention is preferably a formaldehyde-free curable composition. By "formaldehyde-free composition" herein is meant that the composition is substantially free from formaldehyde, nor does it liberate substantial formaldehyde as a result of drying and/or curing. In order to minimize the formaldehyde content of the curable composition, it is preferred, when preparing the emulsion polymer of the present invention, to use polymerization agents such as, for example, initiators, reducing agents, chain transfer agents, biocides, surfactants and the like, which are themselves free from formaldehyde, do not generate formaldehyde during the polymerization process and do not generate or emit formaldehyde during the treatment of a substrate.

The curable aqueous composition may contain, in addition, conventional treatment components such as, for example, emulsifiers, pigments, fillers or extenders, anti-migration aids, curing agents, coalescents, surfactants, biocides, plasticizers, organosilanes, anti-foaming agents, corrosion inhibitors, colorants, waxes, other polymers not of the present invention and anti-oxidants.

The polymer particle size of the aqueous polymer dispersion of the invention is determined by dynamic light scattering method using a Malvern Nanosizer ZS90. The polymer particle size may be expressed as a mean value of volume distribution and is automatically calculated by the Malvern software. The particle size may be measured on a sample of the polymer composition diluted to have an attenuation from 10 to 9 using the following conditions:

| Angles: | 90.0 |
|---|---|
| Number of scan: | min 12 (automatic) |
| Sample Time: | automatic |
| Prescale: | automatic |
| Equilibrations Time: | 250 seconds |
| Repetitions: | repeat 3 times |
| Temperature: | 20.0° C. |
| Viscosity: | 1,031 centipoise |
| Refractive Index dispersant: | 1,330 |

An important advantage of the present invention is to have a crosslinking composition containing only substances compliant with food contact regulation as are of food grade. In addition with biosourced main acrylate monomers, having already itaconic acid and aminoacids as crosslinker b) being biosourced, the aqueous coating compositions of the present invention can be wholly biosourced.

The following experimental part with examples is presented for illustrating the invention and its performances and does not at all limit its covering defined by the claims.

EXPERIMENTAL PART

TABLE 1

Raw materials used for the preparation of
the polymeric compositions

| Designation | More detailed description and Supplier |
|---|---|
| Mersolat ® H95 | Secondary Alkane Sulfonate (Lanxess) |
| Ethyl acrylate (AE) | Arkema |
| Butyl Acrylate (AB) | Arkema |
| Itaconic acid (IT) | AMIK Italia |
| N-methylol acrylamide 48% (NMA) | N-methylol acrylamide 48% in water (SNF) |
| sodium persulfate | United Initiators |
| tert-butyl hydroperoxide | Arkema |
| Sodium metabisulfite | Sodium metabisulfite (Brentagg) |
| Iron (II) sulfate hepta hydrate | Iron (II) sulfate hepta hydrate (UNIVAR) |
| Bruggolite ® E01 | Sodium formaldehyde sulfoxylate (Brueggmann) |
| Bruggolite ® FF6 | Sulfinic acid derivative, (Brueggmann) |
| Ammonium Hydroxide 20% | Yara |
| L(+)Lysine | L(+)Lysine (VWR) |
| L Arginine | L Arginine (Alfa Aesar) |
| Lyoprint ® PT-XN | Thickener (Huntsman) |
| IMPERON ® KB. | Pigment (Dystar) |

The description of the aqueous polymer dispersions tested is presented after table 4 below.

The characteristics of composition of the aqueous polymer dispersions of examples 1-4 are presented in the table 2a below.

TABLE 2a

Characteristics of the polymer dispersions of the examples

| Type of latex and aminoacid added | | Monomeric composition (% weight on total monomers) | Monomeric composition (% molar on total monomers) | Aminoacid added (% weight on total monomers) | Aminoacid added (% molar on total monomers) |
|---|---|---|---|---|---|
| Example 1 (comparative) | NMA-containing latex (no aminoacid) | AE (97.5) NMA (2.5) | AE (97.5) NMA (2.5) | 0 | 0 |
| Example 2 (comparative) | itaconic acid-(IT) containing latex (no aminoacid) | AE (97) IT (3.0) | AE (97.7) IT (2.3) | 0 | 0 |
| Example 3 | Ex 2 + lysine | AE (97) IT (3.0) | AE (97.7) IT (2.3) | 3.2 | 2.3 |
| Example 4 | Ex 2 + arginine | AE (97) IT (3.0) | AE (97.7) IT (2.3) | 3.9 | 2.3 |

The characteristics of pH, viscosity, solids content and particle size are presented in table 2b below.

TABLE 2b

Characteristics of the polymer dispersions of the examples

| | pH | Brookfield viscosity at 20 rpm (mPa · s) | Solids (%) | particle size (nm) |
|---|---|---|---|---|
| Ex 1 (comp) | 6.5 | 100 | 45.0 | 200 |
| Ex 2 (comp) | 4.2 | 58 | 46.7 | 170 |

TABLE 2b-continued

Characteristics of the polymer dispersions of the examples

| | pH | Brookfield viscosity at 20 rpm (mPa · s) | Solids (%) | particle size (nm) |
|---|---|---|---|---|
| Ex 3 | 5.5 | 55 | 45.5 | 170 |
| Ex 4 | 5.5 | 56 | 42.2 | 170 |

The properties of the coalesced polymer particles film (before thermal crosslinking) of each of the aqueous polymer dispersions of examples 1-4 are shown in table 3a below.

TABLE 3a

Polymer film properties before thermal crosslinking

| | Type of latex and added aminoacid | Tensile at break dry (MPa) | Tensile at break wet (7 d water) (MPa) | Elongation at break dry (%) | Elongation at break wet (7 d water) (%) | Water absorption/ solubility (7 d water) (%) | Acetone absorption/ solubility (8 h acetone) (%) |
|---|---|---|---|---|---|---|---|
| Ex 1 (comp) | NMA containing latex (no aminoacid) | 0.60 | 0.20 | 850 | 260 | 32/2.0 | 730/21 |
| Ex 2 (comp) | itaconic acid containing latex (no aminoacid) | 0.20 | 0.18 | >2500 | 480 | 20/5.4 | 1263/17 |
| Ex 3 | Ex 2 + lysine | 0.40 | 0.21 | >2500 | 237 | 40/7.0 | 903/11 |
| Ex 4 | Ex 3 + arginine | 0.60 | 0.15 | >2500 | 150 | 41/67 | 935/11 |

The same properties after thermal crosslinking at 170° C. for 5 minutes are shown in table 3b below.

TABLE 3b

Polymer film properties after crosslink at 170° C. for 5'

| | Type of latex and added aminoacid | Tensile at break dry (MPa) | Tensile at break wet (7 d water) (MPa) | Elongation at break dry (%) | Elongation at break wet (7 d water) (%) | Water absorption/ solubility (7 d water) (%) | Acetone absorption/ solubility (8 h acetone) (%) |
|---|---|---|---|---|---|---|---|
| Ex 1 (comp) | NMA containing latex (no aminoacid) | 1.80 | 1.10 | 396 | 287 | 31/1 | 351/8 |

TABLE 3b-continued

| | | | | | Elongation | Water | Acetone absorption/ |
| | Type of latex and added aminoacid | Tensile at break dry (MPa) | Tensile at break wet (7 d water) (MPa) | Elongation at break dry (%) | at break wet (7 d water) (%) | absorption/ solubility (7 d water) (%) | solubility (8 h acetone) (%) |
|---|---|---|---|---|---|---|---|
| Ex 2 (comp) | itaconic acid containing latex (no aminoacid) | 0.73 | 0.43 | 2500 | 1740 | 40/4 | 1400/13 |
| Ex 3 | Ex2 + lysine | 2.32 | 1.90 | 1600 | 1400 | 40/4 | 720/7 |
| Ex 4 | Ex3 + arginine | 1.40 | 0.50 | 2500 | 1020 | 33/6 | 870/10 |

_Polymer film properties after crosslink at 170° C. for 5'_

The aqueous dispersions of examples 1-4 are also tested in pigment printing application tests, with results as shown in table 4, below.

TABLE 4

_Test results in pigment printing application, after crosslinking_

| | Type of latex and added aminoacid | Washing resistance (Delta E) | Crock fastness dry (mark 1-5) | Crock fastness ethanol (mark 1-5) | Hand (mark 1-5) |
|---|---|---|---|---|---|
| Ex 1 (comp) | NMA containing latex (no amino acid) | 4.8 | 4/5 | 3 | 3 |
| Ex 2 (comp) | itaconic acid-containing latex (no aminoacid) | 9.0 | 4/5 | 3 | 5 |
| Ex 3 | Ex 2 + lysine | 4.6 | 4/5 | 3 | 4 |
| Ex 4 | Ex 2 + arginine | 6.5 | 4/5 | 3 | 5 |

The tested aqueous polymer dispersions are prepared according to the following respective examples 1-4 as disclosed below.

Example 1 or Ex 1: (NMA-Containing Latex)

1904 g of deionized water are added to a glass reactor fitted with a condenser, a stirrer, a temperature control system and inlets for nitrogen, the initiator solutions and the pre-emulsion feed, respectively. A monomer pre-emulsion composed of 1244 g of deionized water, 110 g of a 40% strength solution of MERSOLAT H95, 3267 g of ethyl acrylate and 172 g of a 48% strength N-methylol-acrylamide solution is prepared in another container fitted with a stirrer (pre-emulsifier).

When the contents of the reactor have reached a temperature of 60° C., 212 g of the monomer pre-emulsion and 19 g of 10% sodium persulfate aqueous solution, 0,012 g of Iron sulfate heptahydrate and 0.52 g of sodium metabisulfite dissolved in 15 g of water are added into the reactor. About one minute after the addition of initiator, the remaining portion of the monomer pre-emulsion, 390 g of 5% sodium persulfate aqueous solution and 2.8 g of sodium metabisulfite dissolved in 93 g of water are fed constant rate into the reactor over a period of 3 hours. Taking care to keep the contents of the reactor at a temperature of 60-68° C. throughout the introduction. Then, the reaction medium is maintained at 60-68° C. for a further 60 minutes after that 53 g of 13% tert-butyl hydroperoxide and 128 g of a 4% Bruggolite® E01 solution are fed separately into the reactor at 60° C. over a period of 90 minutes at constant rate.

Fifteen minutes after the end of the above addition, the product obtained is cooled to 35° C. At the end, the mixture is filtered through a screen of 36 mesh.

The pH and solids content are adjusted respectively with ammonia to be between 5.0 and 7.0 and demi water to about 45%.

The dispersion obtained has a pH of 6.5, a viscosity (Brookfield RVT at 20 rpm and at 23° C.) of 100 mPa·s, a dry residue solids content of 45.0% by weight (1 h at 105° C.) and particle size of 200 nm.

This dispersion contains only 2.5% of N-methylol acrylamide on total monomers, (2.5% on mol base).

Example 2 or Ex 2: Itaconic Acid-Containing Latex 1904 g of deionized water are added to a glass reactor fitted with a condenser, a stirrer, a temperature control system and inlets for nitrogen, the initiator solutions and the pre-emulsion feed, respectively. A monomer pre-emulsion composed of 1321 g of deionized water, 117 g of a 40% strength solution of MERSOLAT H95, 3274 g of ethyl acrylate g and 101 g of itaconic acid is prepared in another container fitted with a stirrer (pre-emulsifier).

When the contents of the reactor have reached a temperature of 60° C., 212 g of the monomer pre-emulsion and 19 g of 10% sodium persulfate aqueous solution, 0,012 g of Iron sulfate heptahydrate and 0.52 g of sodium metabisulfite dissolved in 15 g of water are added into the reactor. About one minute after the addition of initiator, the remaining portion of the monomer pre-emulsion, 390 g of 5% sodium persulfate aqueous solution and 2.8 g of sodium metabisulfite dissolved in 93 g of water are fed constant rate into the reactor over a period of 3 hours. Taking care to keep the contents of the reactor at a temperature of 60-68° C. throughout the introduction. Then, the reaction medium is maintained at 60-68° C. for a further 60 minutes after that 53 g of 13% tert-butyl hydroperoxide and 143 g of a 6% Bruggolite® FF6 solution are fed separately into the reactor at 60° C. over a period of 90 minutes at constant rate.

Fifteen minutes after the end of the above addition, the product obtained is cooled to 35° C. At the end, the mixture is filtered through a screen of 36 mesh.

The pH and solids content are adjusted respectively with ammonia to be between 5.0 and 6.0 and demi water to about 45%.

The dispersion obtained has a pH of 4.2 a viscosity (Brookfield RVT at 20 rpm and at 23° C.) of 58 mPa·s, solids content of 46.7% by weight (1 h at 105° C.) and particle size of 170 nm.

This dispersion contains only 3% of itaconic acid on total monomers, (2.3% on mol base).

Example 3 or Ex 3 (Ex 2+Lysine): Aqueous Dispersion of Example 2 with Added Lysine According to the Invention To 1000 g of the polymer dispersion of example 2, we add 14.4 g of L-Lysine dissolved in 40 g of demineralized water.

The dispersion obtained has a pH of 5.5, a viscosity (Brookfield RVT at 20 rpm and at 23° C.) of 55 mPa·s, a solids content of 45.5% by weight (1 h at 105° C.) and particle size of 170 nm.

This dispersion contains only 3% of itaconic acid on total monomers (2.3% on mol base) and 3.2% of L Lysine on total monomers (2.3% on mol base).

Example 4 or Ex 4 (Ex 2+Arginine): Aqueous Dispersion of Example 2 with Added Arginine According to the Invention To 1000 g of the polymer dispersion of example 2, we add 17.6 g of L Arginine dissolved in 100 g of demineralized warm water.

The dispersion obtained has a pH of 5.5, a viscosity (Brookfield RVT at 20 rpm and at 23° C.) of 56 mPa·s, a dry residue (solids content) of 42.2% by weight (1 h at 105° C.) and a pre-coagulate content on a screen of 275 mesh of about 150 ppm and particle size of 170 nm.

This dispersion contains only 3% of itaconic acid on total monomers (2.3% on mol base) and 3.9% of L Arginine on total monomers (2.3% on mol base).

Characterization of the Polymer Films: Conditions and Test Methods Used

The tests carried out on the polymer films are:

1) Determination of the maximum tensile strength and the elongation at break according to DIN standard 53455, using a type 4 test sample and a traction speed of 300 mm/min, both in the dry state and after swelling the test samples in water for 7 days, before and after crosslinking at 170° C. for 5' in a vented oven.

2) Determination of water, ethanol and acetone absorption.

It was carried out by dipping specimen having 2 cm×2 cm sizes and about 1 g weight in the specific solvent.

The specimens were weighed before dipping and weighed again after a time of 7 days for water, 8 hours for the other solvents, after having removed, with paper towels, the possible liquid present on their surface.

These tests have been carried out before and after crosslinking at 170° C. for 5' in a vented oven.

The lower is the value of absorption the higher is the crosslinking (crosslink density). It is particularly important the decrease of these values after thermal treatment (crosslinking).

3) Dynamic Mechanical Analysis (DMA)

The measure of dynamic modulus E' (storage modulus) of the polymer films dried 7 days at 23° C., obtained from the dispersions of the examples 1-4 versus temperature, has been carried out on specimen of polymer films of dimension of about 6.0×2.0×25.0 mm. The measures have been done by using a dynamic mechanical analyzer DMA 242 E1G Artemis NETZSCH with dual cantilever geometry on a temperature range from −60 to 200° C. The results of E' vs temperature are shown in the Figure.

The thermal crosslinking is evidenced by the increase of modulus E' with respect to same film without any crosslinking (see examples 3 and 4 vs example 2). After crosslinking is finished, the modulus E' value remains relatively constant with still increasing temperature. The modulus E' of the same film without a crosslinker (none crosslinking as in example 2) decreases at higher increasing temperature, due to the free viscous flow of polymeric chains at such higher temperatures.

It is easy to see in the Figure that for Ex 3 (according to the invention) there is a sharp increase of E' between 110° C. to 150° C. and for Ex 4 (invention) E' remains higher than E' for Ex 2 (comparative without effective crosslinking). Evidence of crosslinking (by E' increase with temperature) is also obtained for comparative example 1 which corresponds to NMA-containing latex polymer (which is not a formol-free solution as the present invention).

Characterization in Pigment Printing Application: Conditions and Tests Methods Used Preparation of Pigmented Paste Formulation The pigmented paste formulations are prepared with the aqueous polymer dispersions of the above-cited examples by diluting to a 5% of solids, adding ammonia until pH is comprised between 8.5 and 9.0 and finally thickening the formulation with Lyoprint® (PT-XN/Huntsman) up to the Brookfield viscosity is 18 000 mPa·s. Then, to this formulation is added 3% of blue pigment IMPERON® KB/Dystar.

Then, the pigment pastes are applied at a speed of 10 m/min with automatic applicator J ZIMMER, on cotton fabric ISO 105 F02, dried at 120° C. for 3 minutes and then cross-linked at 150° C. for 3 minutes.

Crock-Fastness Test

To and from motion frictions cycles with standard white cotton are done on the pigment printed textile. These frictions are made following 3 kinds of conditioning of white cotton samples.

dry cotton: 10 cycles
water cotton: 10 cycles
ethanol cotton: 50 cycles

After drying, we evaluate the white cottons discoloration with a standard grey scale (ref: ISO 105-A03), all measurements are done with a spectrophotometer measuring L*a*b.

The results are reported in a scale from 1 to 5, where 5 is the best and 1 is the worst.

Domestic Washing Resistance Following NF G 07 093-6 Standard

The test is carried out by using a washing solution, composed by 4 g of detergent (ECE without optical brightener) per liter of water, with pH adjusted at 10.5 with sodium carbonate and adding to it just before the test 1 g/l of sodium perborate.

The test is carried out on specimens of printed textile (10 cm×4 cm) made by sewing the cotton printed sheets between two control materials (cotton and viscose) of the proper dimensions.

The 500 ml capsule used for the washing machine MATIS are filled with 50 ml of washing solution, 25 stainless steel balls (6 mm of diameter) and the specimens with the control materials.

The washing is carried out at a temperature of 60° C. for 30 min at rotation speed of 40 rpm.

After the first washing cycle, the specimens are dried and the color is measured with the spectrophotometer. After the first cycle, 4 additional cycles are carried out on the same specimen without any intermediate drying.

The results are expressed in "delta E" in comparison with initial values by L*a*b* measurements after the first and $5^{th}$ washings cycles.

Lower is the value of "delta E" better is the result, meaning a lower discoloration during the washing test, meaning improved resistance to washing.

Softness

The softness test is carried out by evaluating the softness of the fabrics prepared with the same amount of pigmented paste and dried with the same applicative conditions. The assessment of softness is returned by a personal judgment by taking printed tissues between fingers and determining by touching the softer ones.

The invention claimed is:

1. An aqueous coating composition comprising:
a) an aqueous polymer dispersion, said polymer remaining insoluble in water after neutralization and remaining in the form of dispersed polymeric particles having a mean particle size varying from 10 to 1000 nm, wherein said polymer a) comprises monomeric units from the following monomers:
   a1) at least one ethylenically unsaturated monomer selected from the group consisting of acrylic and vinylinic monomers, with the exception of (meth) acrylic acid monomers, and
   a2) at least one ethylenically unsaturated monomer different from a1) and bearing at least two carboxylic acid functional groups at a weight content with respect to the total weight of said copolymer of from 0.1% to 15%; and
b) a crosslinker selected from amino acids bearing at least two amino functional groups capable of reacting with said carboxylic acid functional groups,
   where a molar ratio of the amino groups of said crosslinker b) to the carboxy groups of said polymer of dispersion a) is of from 0.1 to 3.0.

2. The aqueous coating composition according to claim 1, wherein said monomer a2) is a dicarboxylic acid or anhydride monomer selected from the group consisting of: maleic acid and anhydride, fumaric acid, itaconic acid and anhydride, tetrahydrophthalic acid and anhydride (cis 4-cyclohexene, 1,2-dicarboxylic acid and anhydride).

3. The aqueous coating composition according to claim 1, wherein said monomer a2) is itaconic acid or anhydride.

4. The aqueous coating composition according to claim 1, wherein said monomer a1) comprises at least one selected from the group consisting of C1-C18 alkyl (meth)acrylates, hydroxy alkyl C2-C4 (meth)acrylates, ureido-acetoacetate-diacetone-amido-functional (meth)acrylic and vinylic monomer, vinyl acetate, vinyl fumarate, styrene, acrylonitrile, unsaturated silane, maleate, and butadiene.

5. The aqueous coating composition according to claim 1, where the molar ratio of the amino groups of said crosslinker b) to the carboxy groups of said polymer of dispersion a) is from 0.1 to 2.0.

6. The aqueous coating composition according to claim 1, wherein said aqueous polymer dispersion a) has a solids content of from 25 to 60% by weight with respect to the weight of said dispersion a).

7. The aqueous coating composition according to claim 1, wherein said crosslinker b) is selected from: asparagine, arginine, glutamine, histidine, lysine, and tryptophan.

8. A method of coating or treating a flexible fibrous substrate, comprising successive steps:
   i) coating said flexible fibrous substrate with the aqueous coating composition as defined in claim 1, either by impregnation or by spraying or by using a coater,
   ii) curing the aqueous coating composition by heating the resulting substrate at a temperature in the range from 100 to 230° C., without any addition of any catalyst of the curing reaction, and
   iii) cooling the resulting coated or treated flexible substrate to ambient temperature.

9. A coated or treated flexible porous substrate, resulting from the method defined according to claim 8.

10. A coated or treated flexible substrate of claim 9, selected from woven and non-woven fibers, fabrics, textile, paper, cardboard and glass fibers.

11. A coating resulting from the crosslinking (cure) by said crosslinker b) of the coating composition as defined in claim 1.

12. The aqueous coating composition according to claim 1, wherein said coating composition is free of any added catalyst (0%) for the reaction between said amino groups of said crosslinker and said carboxy group of said polymer and able to cure at a pH range lower than 6.

13. The aqueous coating composition according to claim 1, wherein the at least one ethylenically unsaturated monomer a2) is present at a weight content with respect to the total weight of said copolymer of from 0.2% to 10%.

14. The aqueous coating composition according to claim 1, wherein at least one of said carboxy groups of polymer a) reacts with at least one of said amino groups of said crosslinker b).

15. The aqueous coating composition according to claim 1, wherein said polymer a) is crosslinked by said crosslinker b) at a temperature in the range of from 100° C. to 230° C.

* * * * *